United States Patent [19]

Millot et al.

[11] Patent Number: 4,606,881

[45] Date of Patent: Aug. 19, 1986

[54] UPPER INTERNAL EQUIPMENT OF A PRESSURIZED WATER NUCLEAR REACTOR

[75] Inventors: Jean-Paul Millot, Elancourt; Patrice Alibran, Paris; Guy Desfontaines, Puteaux; Pol Dejeux, Nogent-sur-Marne, all of France

[73] Assignee: Framatome & Cie, Courbevoie, France

[21] Appl. No.: 442,213

[22] Filed: Nov. 16, 1982

[30] Foreign Application Priority Data

Dec. 4, 1981 [FR] France .................. 81 22753

[51] Int. Cl.$^4$ .............................................. G21C 7/00
[52] U.S. Cl. ..................................... 376/353; 376/346
[58] Field of Search ............... 376/353, 346, 333, 332

[56] References Cited

U.S. PATENT DOCUMENTS

| | | | |
|---|---|---|---|
| 3,425,904 | 2/1969 | Bogaardt | 376/346 |
| 3,734,825 | 5/1973 | Schabert et al. | 376/353 X |
| 3,816,245 | 6/1974 | Bevilaequa | 376/353 X |
| 3,859,165 | 1/1975 | Radkowsky et al. | 376/346 X |
| 3,930,938 | 1/1976 | Berglund et al. | 376/353 X |
| 3,940,311 | 2/1976 | Frisch et al. | 376/353 X |
| 4,092,216 | 5/1978 | Aubert | 376/353 |
| 4,173,513 | 11/1979 | Obermeyer et al. | 376/353 |

FOREIGN PATENT DOCUMENTS

| | | | |
|---|---|---|---|
| 0029399 | 5/1981 | European Pat. Off. | 376/333 |
| 2411469 | 8/1979 | France | 376/353 |

*Primary Examiner*—Charles T. Jordan
*Assistant Examiner*—Dan Wasil
*Attorney, Agent, or Firm*—Pollock, Vande Sande & Priddy

[57] ABSTRACT

Upper internal equipment of a pressurized water nuclear reactor, comprising guide tubes containing guide plates and sleeves adapted to two different types of charge of the reactor core, one for obtaining a thermal neutron spectrum and the other for obtaining an epithermal spectrum. The plates (20) and the sleeves (33, 34) have, for each of the guide tubes, a first set of perforations (31, 36) and a second set of perforations (30, 35) for guiding the control rods in either case. The invention applies to a pressurized water reactor operating either as a conventional reactor or as an undermoderated reactor.

2 Claims, 3 Drawing Figures

UPPER INTERNAL EQUIPMENT OF A PRESSURIZED WATER NUCLEAR REACTOR

FIELD OF THE INVENTION

The invention relates to the upper internal equipment of a pressurized water nuclear reactor.

BACKGROUND OF THE INVENTION

A pressurized water nuclear reactor comprises a vessel containing a core consisting of prismatic fuel arrays arranged side by side and resting vertically on a core-supporting plate which is transverse relative to the vessel.

Another transverse plate, pierced with orifices opposite each of the fuel arrays and referred to as the upper core plate, is arranged above the core.

Tubes for guiding the control rods are arranged on the upper core plate, vertical to some of the arrays.

These vertical tubes, resting with their lower end on the upper core plate, permit the guiding of the control rods, which consist of clusters of long rods containing a strongly neutron-absorbing material.

For the operation of the reactor, these control rods are displaced vertically so as to enter the fuel arrays to a greater or lesser depth, the arrays being equipped with guide tubes substituted for some of the fuel rods in order to receive and guide the absorbing rods of the control rod, inside the fuel arrays.

The guide tubes arranged above the upper core plate are fixed, at their upper part, to a support plate, which is itself joined to the upper core plate via cell-like spacers, which provide the rigidity of the assembly.

The guide tubes, their support plate and the spacers constituting the upper internal equipment of the reactor occupy the upper part of the vessel.

The guide tubes contain discontinuous devices and continuous devices permitting the guiding of the control rod when it is being moved vertically for controlling the reactor, or when it is dropped into the position of maximum insertion for emergency shutdown of the reactor.

The discontinuous guide devices consist of plates located transversely in the tubes, at regular intervals, in the upper part of the latter.

The continuous guide devices consist of long sleeves possessing vertical channels for guiding the control rod, and are located in the lower part of the guide tubes.

To bring the nuclear reactor into operation, all the fuel arrays constituting the core are introduced into the reactor vessel and come to rest on the core-supporting plate; each of the fuel arrays consists of a bundle of fuel rods kept apart by spacers, so that, in transverse planes, the fuel rods form a uniform lattice.

The pressurized water coming into contact with the fuel rods of the arrays serves both as a moderator fluid and a heat-transfer fluid.

In conventional pressurized water nuclear reactors of the moderation ratio in the reactor core, i.e., the ratio of the volume of moderator fluid to the volume of fuel material, is such that the neutrons produced are greatly moderated. Their energy spectrum is said to be "thermal".

By reducing the moderation ratio, it is possible to obtain a different spectrum, called "epithermal", the neutrons being moderated to a much smaller extent.

The transition from one type of operation to another can be achieved by substituting, for fuel arrays of conventional type, arrays which make it possible to obtain a low moderation ratio. To do this, a fuel material enriched in fissile material is used and an arrangement of the fuel rods is adopted which makes it possible to reduce the free volume inside the array. It has been proposed, for example, to use spacers consisting of a simple wire wound in a helix around the fuel rods, making it possible to obtain a low volume ratio of moderator to fuel.

By arranging, in certain parts of the core, in particular at its periphery, fuel arrays containing a fertile material, such as uranium depleted in uranium 235, in a nuclear reactor operating with an epithermal neutron spectrum, it is possible to produce a certain amount of fissile material from the fertile material.

PRIOR ART

Nuclear reactors referred to as "undermoderated reactors" have therefore been envisaged, which make it possible to obtain an epithermal neutron spectrum and to regenerate a certain amount of fissile material from fertile material.

However, the design and construction of such reactors, which are different from pressurized water reactors of conventional type, can lead to additional costs and technical difficulties in the drawing up of an equipment schedule in nuclear power stations.

Furthermore, it can restrict the operator if he is obliged to operate the reactor constantly as an undermoderated reactor.

For these reasons, consideration has been given to constructing pressurized water nuclear reactors which could operate successively as conventional reactors and as undermoderated reactors.

The transition from one type of operation to another could be effected at the time of total recharging of the reactor.

Consideration has therefore been given to using fuel arrays of which the external shape is identical, but of which the arrangement and the composition of the fuel rods are different, for forming the charge of the reactor, depending on the type of operation desired.

However, it is necessary to adapt the upper internal equipment to the charge arranged in the core, because this upper internal equipment comprises guide tubes for control rods associated with some of the arrays of the core. These control rods are in fact different in the case of operation as an undermoderated reactor and in the case of operation as a conventional reactor.

It has therefore been impossible, in practice, to pass from operation as a conventional reactor to operation as an undermoderated reactor.

OBJECT OF THE INVENTION

The object of the invention is therefore to propose upper internal equipment for a pressurized water nuclear reactor comprising a vessel containing a core consisting either of a first assembly of prismatic fuel arrays, or of a second assembly comprising arrays different from those of the first assembly as regards the distribution and composition of the fuel rods, but of the same length and the same cross-section, arranged side by side and vertically, the first assembly of arrays producing a thermal neutron spectrum in the reactor in operation, and the second assembly producing an epithermal spectrum, the core being located under an upper core plate which is transverse relative to the vessel and which carries an assembly of tubes for guiding control rods, the said guide tubes resting vertically on the upper core plate, vertical to some of the arrays, and being fixed by their upper ends to a support plate joined to the upper core plate by spacers, the guide tubes and their support constituting the upper internal equipment of the reactor, while discontinuous guide devices, consisting of perforated plates, and continuous guide devices, consisting of long perforated sleeves, are arranged inside the guide tubes, this internal equipment permitting the transition from operation with a thermal neutron spectrum to operation with an epithermal spectrum by simply changing the charge of the core.

For this purpose, the plates and sleeves possess, for each of the guide tubes, a first set of perforations for guiding the control rods associated with the arrays of the first assembly, and a second set of perforations for guiding the control rods associated with the arrays of the second assembly.

BRIEF DESCRIPTION OF THE DRAWINGS

In order to provide a clear understanding of the invention, an embodiment of the upper internal equipment of a pressurized water nuclear reactor, the core of which contains fuel arrays of hexagonal cross-section, will now be described by way of example, with reference to the attached drawings, in which.

DESCRIPTION OF PREFERRED EMBODIMENT

Figure 1:
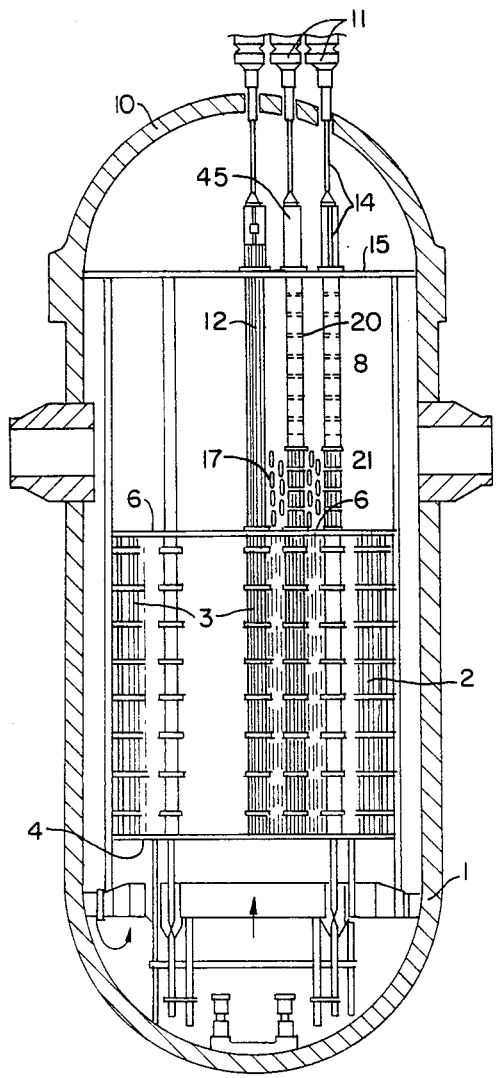
FIG. 1 shows a view in section, through a vertical plane, of the vessel of a pressurized water nuclear reactor.

FIG. 1 shows the vessel 1 of a pressurized water nuclear reactor inside which the reactor core 2 is arranged, consisting of an assembly of arrays 3 arranged vertically and with their lower ends resting on the lower core plate 4.

The upper core plate 6, pierced with openings in the region of each of the arrays, is arranged above the core 2, and the guide tubes 8, located vertical to some of the arrays of the core, rest on the said upper core plate.

Mechanisms 11 for displacing the control rods 12 are located above the hemispherical cover 10 of the vessel, the said control rods being joined to the lower end of control bars 14 acted upon by the mechanisms 11.

The control rods 12 can move inside the arrays 3, inside guide tubes replacing some of the fuel rods in the lattice of these arrays.

Figure 2:
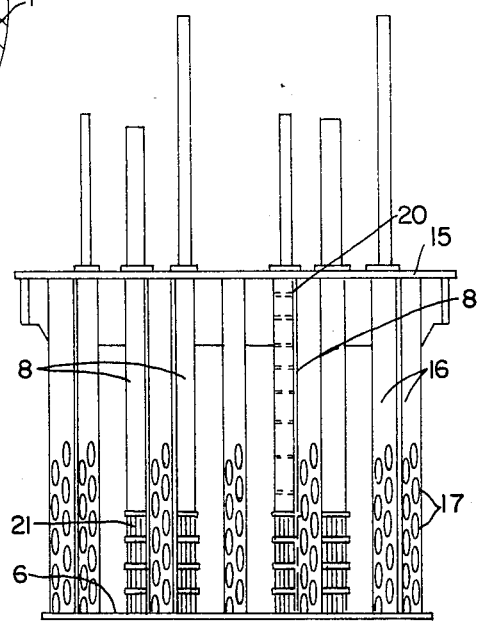
FIG. 2 shows a view in elevation of the upper internal equipment of this reactor.

FIG. 2 shows all the upper internal equipment of the reactor shown in FIG. 1, comprising the guide tubes 8 resting on the upper core plate 6.

The upper end of the guide tubes 8 is joined to a support plate 15 parallel to the plate 6.

The plates 6 and 15 are joined to one another by tubular spacers 16 pierced with openings 17 for the circulation of the cooling fluid consisting of the pressurized water filling the vessel. By virtue of these spacers 16, the upper internal equipment forms a rigid assembly firmly fixed to the upper core plate.

Located inside each of the guide tubes 8 and over the whole of their upper part, there are discontinuous guide devices consisting of perforated plates 20 regularly spaced along the length of the tube.

The lower part 21 of the guide tubes constitutes a continuous device for guiding the control rods, in which the perforations lie in the extension of the perforations in the discontinuous devices 20. The part 21 of the guide tubes consists of a tubular envelope inside which sleeves are fixed, which occupy the whole height of the zone 21 and possess vertical channels for guiding the control rod.

The control rods 12 each consist of a cluster of absorbing rods joined, at their upper part, by a crosspiece, which is itself joined to the lower part of the control bar 14.

Figure 3:
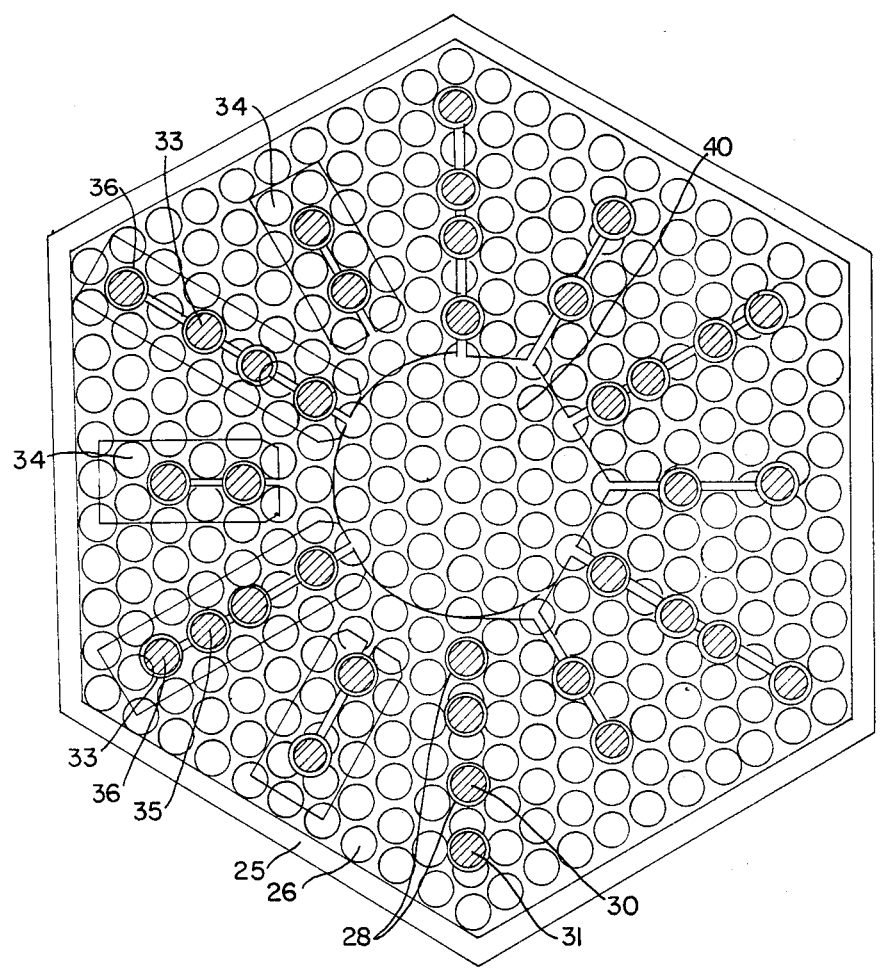
FIG. 3 shows, on the right-hand side, the location of the perforations in a guide plate, and, on the left-hand side, the location of the perforations in guide sleeves, superimposed on the cross-section of a hexagonal array comprising eighteen guide tubes.

Reference to FIG. 3 shows the hexagonal cross-section of a prismatic casing 25 of a fuel array containing fissile or fertile fuel rods 26 separated by spacers consisting of a wire wound around each of the rods. In this way, a low moderation ratio is obtained together with an epithermal neutron spectrum in the reactor core consisting of arrays of the type shown in FIG. 3.

To produce the undermoderated fuel array, the fuel rods 26 have been arranged inside the casing in eleven successive layers starting from the center of the array, the first layer consisting of a rod arranged along the axis of this array.

Furthermore, fuel arrays leading to a higher moderation ratio and to a thermal neutron spectrum in the reactor core consisting of these arrays have been produced by using the same casing and arranging therein nine successive layers of rods containing a fertile material less enriched than that of the rods 26 and having a slightly larger diameter.

As the lattice of these rods is denser, these rods must be shorter in order to obtain a given power from the reactor core consisting of these arrays, if they are compared with the arrays leading to a thermal neutron spectrum.

To be able to substitute the arrays of one type for the arrays of the other type, it is necessary for these arrays to have the same cross-section and the same length. Thus, an end having an extension, which simultaneously effects the channeling of the pressurized water inside the array, is arranged at the lower end of the arrays comprising shorter fuel rods.

FIG. 3 shows that guide tubes 28, permitting the introduction, into the array of the absorbing rods of the cluster constituting the control rod, have been substituted for some of the fuel rods 26.

Eighteen guide tubes are used for the whole of an array.

The right-hand side of FIG. 3 shows, superimposed on the cross-section of the array, the profile and the perforations of the guide plates 20 which must be arranged in the upper part of the guide tubes 8. The left-hand side of the figure shows the cross-sections of the corresponding guide sleeves arranged in the part 21 of the guide tubes 8. These guide plates and sleeves have perforations 30 in the extension of the guide tubes 28 of the array for undermoderated reactors, and perforations 31 in positions staggered relative to the perforations 30. These perforations 31, having a slightly larger diameter than the perforations 30, serve to guide the control rods associated with the arrays for the reactor in its configuration corresponding to a thermal neutron spectrum.

It is not possible to use similar control rods for both types of arrays. In fact, the lattices of fuel rods in both cases are staggered, the diameters of the guide tubes are not equal and, in the case of the array for an under-moderated reactor, it is necessary to place the guide tubes as far as possible from the edge of the array. In fact, in this case, the guide tubes, which are filled with water when the control rods are not inserted therein, introduce zones in which the moderation ratio increases considerably, and this runs the risk of introducing power peaks, of which the presence on the edges of the array is to be avoided.

The guide tubes 28 are therefore arranged closer to the center of the array than the guide tubes corresponding to the perforations 31.

Each of the guide plates 32 thus has thirty-six perforations constituting two different sets, which are used for the discontinuous guiding of one of either type of control rod.

In the same way, the guide sleeves, such as 33, each have two sets of two perforations and the guide sleeves 34 have a single set.

Together, the six sleeves 33 and the six sleeves 34 for each of the guide tubes thus have thirty-six guide channels constituting a first assembly 35 in alignment with the perforations 30 and a second assembly 36 in alignment with the perforations 31.

Advantageously, guide sleeves 34 will be produced in applicants' accordance with the description in U.S. patent application Ser. No. 441,872.

Each guide plate has a central recess 40 permitting the passage of the cluster joining the absorbing rods.

In this way, it is possible to use the same guide tubes and the same upper internal equipment when using either type of array, corresponding to one type of operation of the nuclear reactor or another.

For the transition of the reactor from one mode of operation to another, the upper internal equipment need not be modified, and only the charge of the reactor core, i.e., the fuel arrays and their control rods, need to be changed.

It can be seen that one of the advantages of the invention is to simplify the design and construction of under-moderated reactors, since it requires only a slight modification to the upper internal equipment of conventional reactors.

Another advantage is to permit a very easy transition from one type of operation to another by simply changing the charge of the reactor.

It is possible to envisage guide plates and sleeves adapted to structures of fuel arrays other than that which has been described, in which the fuel array has a hexagonal cross-section. It is also possible to envisage the application of the invention in the case of a different number of guide tubes in each of the arrays, and to envisage a different distribution of these guide tubes.

The invention applies to a pressurized water nuclear reactor, irrespective of the number of loops in the primary circuit thereof.

We claim:

1. In a pressurized water reactor comprising
   (a) a pressure vessel (1);
   (b) a core (2) comprising a plurality of prismatic fuel assembles (3) arranged side by side and vertically;
   (c) a horizontal upper core plate (6) located transverse relative to said vessel above said core;
   (d) a plurality of control rods (12) each comprising a cluster of neutron absorbing rods associated with a drive mechanism (11) for moving said cluster vertically into and out of said core;
   (e) a plurality of vertical guide tubes (8) resting on said upper core plate (6), attached at their upper ends to a support plate (15) joined to said upper core plate by spacers (16), each of said guide tubes being located vertically in alignment with one of said fuel assemblies (3);
   (f) each of said guide tubes (8) having in an upper part thereof plates (20) located transversely at intervals and formed with perforations for discontinuous guiding of said neutron absorbing rods (12) and having in a lower part thereof sleeves having vertical channels aligned with said perforations for continuous guiding of said neutron absorbing rods;
   the improvement consisting in the fact that each of said guide tubes (8) includes both
   (g) a first set of said perforations and channels distributed for guiding said neutron absorbing rods (12), having a first predetermined distribution of a first type of said control rods; and
   (h) a second set of said perforations and channels distributed for guiding the neutron absorbing rods (12) of a second type of said control rods, having a second predetermined distribution and diameter different from those of the control rods of the first type, said first set of perforations having a diameter different than said second set of perforations;
   (i) where either of the two types of control rods may be selectively used in any one of said guide tubes of the reactor and respectively associated with each of two different types of said fuel assemblies having the same cross-section, only one of said types of control rods being in said guide tubes at any given time, one of said types of assemblies producing a thermal neutron spectrum in said core and the other of said types of assemblies producing an epithermal spectrum.

2. The improvement according to claim 1, wherein said fuel assemblies are of hexagonal cross-section, and comprise guide plates having two sets of eighteen perforations arranged in staggered relation to one another in the direction of the assembly.

* * * * *